(12) United States Patent
Yanagida et al.

(10) Patent No.: US 11,286,846 B2
(45) Date of Patent: Mar. 29, 2022

(54) ACTUATOR

(71) Applicant: DENSO CORPORATION, Kariya (JP)

(72) Inventors: Etsugo Yanagida, Kariya (JP); Tetsuji Yamanaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 112 days.

(21) Appl. No.: 16/902,571

(22) Filed: Jun. 16, 2020

(65) Prior Publication Data

US 2020/0309024 A1  Oct. 1, 2020

Related U.S. Application Data

(63) Continuation-in-part of application No. PCT/JP2018/046326, filed on Dec. 17, 2018.

(30) Foreign Application Priority Data

Dec. 19, 2017 (JP) .............................. JP2017-242873

(51) Int. Cl.
*F02B 39/10* (2006.01)
*H02K 7/116* (2006.01)

(52) U.S. Cl.
CPC .............. *F02B 39/10* (2013.01); *H02K 7/116* (2013.01)

(58) Field of Classification Search
CPC ...... F02B 39/10; F02B 37/183; F02B 37/186; H02K 7/116; H02K 5/225; H02K 11/215; Y02T 10/12; F16D 1/072
See application file for complete search history.

(56) References Cited

U.S. PATENT DOCUMENTS

| 10,663,076 B2 * | 5/2020 | Yamanaka ............ F02B 37/186 |
| 2006/0000443 A1 | 1/2006 | Kado et al. |
| 2018/0259088 A1 | 9/2018 | Yamanaka et al. |

\* cited by examiner

*Primary Examiner* — Brandon D Lee
(74) *Attorney, Agent, or Firm* — Nixon & Vanderhye P.C.

(57) ABSTRACT

An actuator includes an electric motor, an output shaft and an output lever. The output lever is fixed to one end portion of the output shaft, which is located at an outside of a housing. The output lever includes a cylindrical hole, through which a cylindrical portion of the output shaft is received, and a cutout, which is radially outwardly recessed from the cylindrical hole. A part of an inner wall surface of the cutout, which is connected to an inner wall surface of the cylindrical hole, is defined as a root corner. The root corner is shaped in a convex curved surface form in a view taken in an axial direction of the cylindrical hole.

12 Claims, 14 Drawing Sheets

ACTUATOR

CROSS REFERENCE TO RELATED APPLICATIONS

This application is a continuation application of International Patent Application No. PCT/JP2018/046326 filed on Dec. 17, 2018, which designated the U.S. and claims the benefit of priority from Japanese Patent Application No. 2017-242873 filed on Dec. 19, 2017. The entire disclosures of all of the above applications are incorporated herein by reference.

TECHNICAL FIELD

The present disclosure relates to an actuator.

BACKGROUND

Previously, there is known an actuator, in which one end portion of an output shaft is exposed at an outside of the housing, and an output lever is fixed to this one end portion of the output shaft. The output lever has a plurality of cutouts (recesses), each of which is shaped in a semicircular form and is radially outwardly recessed from the cylindrical hole. The one end portion of the output shaft bites into the cutouts through the swaging process. The output shaft transmits a torque to the output lever through the biting parts of the one end portion of the output shaft, which bite into the cutouts, respectively.

However, when a large torque acts on the output shaft, a stress is concentrated at a root of each biting part of the output shaft, which corresponds to a root corner of the corresponding cutout. Therefore, there is a possibility that the biting part of the output shaft is damaged by a shearing force.

SUMMARY

This section provides a general summary of the disclosure, and is not a comprehensive disclosure of its full scope or all of its features.

According to the present disclosure, there is provided an actuator that includes an electric motor, an output shaft and an output lever. The output lever is fixed to one end portion of the output shaft, which is located at an outside of a housing. The output lever includes a cylindrical hole, through which a cylindrical portion of the output shaft is received, and a cutout, which is radially outwardly recessed from the cylindrical hole. A part of an inner wall surface of the cutout, which is connected to an inner wall surface of the cylindrical hole, is defined as a root corner. The root corner is shaped in a convex curved surface form in a view taken in an axial direction of the cylindrical hole

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
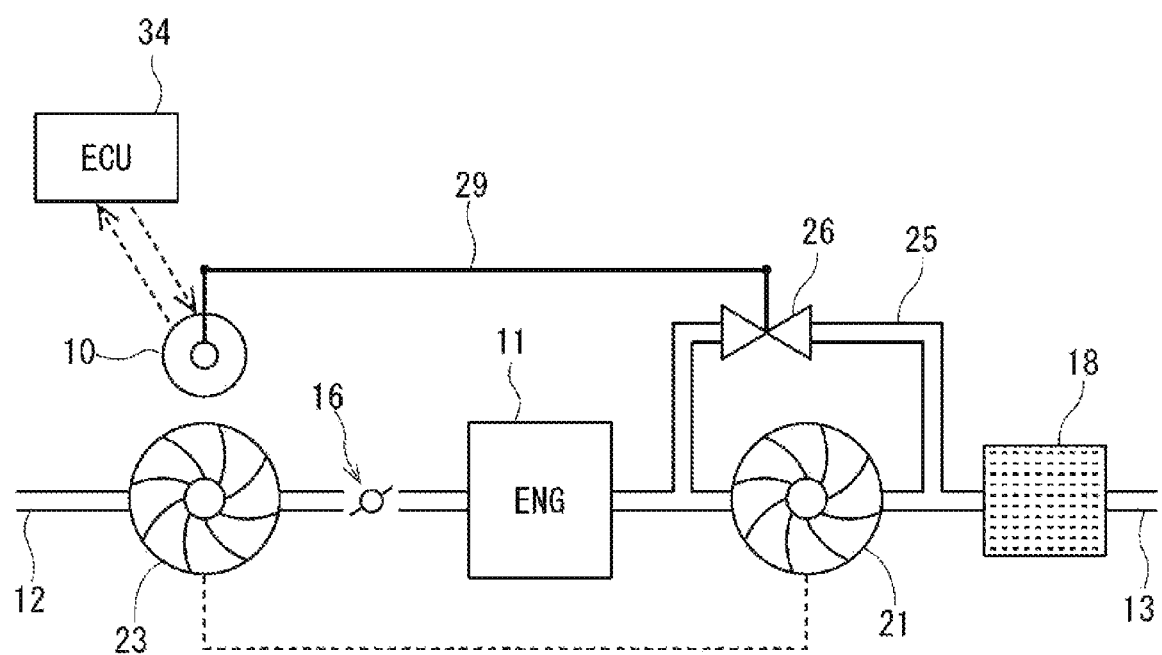
FIG. 1 is a schematic diagram of an intake and exhaust system of an internal combustion engine, to which an actuator of a first embodiment is applied.

Previously, there is known an actuator, in which one end portion of an output shaft is exposed at an outside of the housing, and an output lever is fixed to this one end portion of the output shaft. For example, one such an actuator adjusts a valve opening degree of a boost pressure control valve to control a boost pressure. At the actuator, the one end portion of the output shaft is inserted into a cylindrical hole of the output lever and is swaged, i.e., is plastically deformed against the cylindrical hole through a swaging process, so that the output lever is fixed to the one end portion of the output shaft.

The output lever has a plurality of cutouts (recesses), each of which is shaped in a semicircular form and is radially outwardly recessed from the cylindrical hole. The one end portion of the output shaft bites into the cutouts through the swaging process. The output shaft transmits a torque to the output lever through the biting parts of the one end portion of the output shaft, which bite into the cutouts, respectively.

However, when a large torque acts on the output shaft, a stress is concentrated at a root of each biting part of the output shaft, which corresponds to a root corner of the corresponding cutout. Therefore, there is a possibility that the biting part of the output shaft is damaged by a shearing force while this damage starts from the stress concentrated location of the biting part.

An actuator of the present disclosure includes: an electric motor; a speed reducer that is connected to the electric motor; an output shaft that is connected to the speed reducer; a housing that receives the electric motor and the speed reducer and supports the output shaft; and an output lever that is fixed to one end portion of the output shaft, which is located at an outside of the housing.

The one end portion of the output shaft has a large diameter portion, a cylindrical portion and an enlarged diameter portion, which are axially arranged in this order from a side where the housing is placed. The output lever includes a cylindrical hole, through which the cylindrical portion is received, and a cutout, which is radially outwardly recessed from the cylindrical hole. The output lever contacts a step surface formed between the large diameter portion and the cylindrical portion. The enlarged diameter portion includes a flange, which has a diameter larger than a diameter of the cylindrical portion, and a biting part, which extends into the cutout. A part of an inner wall surface of the cutout, which is connected to an inner wall surface of the cylindrical hole, is defined as a root corner. The root corner is shaped in a convex curved surface form in a view taken in an axial direction of the cylindrical hole.

Therefore, the root of the biting part, which corresponds to the corresponding root corner, is shaped in a concave curved surface form that conforms with the shape of the root corner. Thus, the stress concentration to the root of the biting part at the time of applying the torque is limited. Thereby, the shear strength of the biting part can be improved, so that the damage of the output shaft can be limited.

Furthermore, the output shaft and the output lever are assembled together by inserting the cylindrical portion into the cylindrical hole, so that it is possible to limit variations in a pitch of the output shaft measured from the central axis. Furthermore, by contacting the output lever to the step surface of the output shaft, it is possible to limit variations in the axial position of the output lever relative to the output shaft. Furthermore, the torque is transmitted by using the engaging force between the biting part and the inner wall surface of the cutout in addition to the frictional force between the cylindrical portion and the inner wall surface of the cylindrical hole, so that a sufficient strength of the swaged engagement can be ensured against the large torque.

Now, various embodiments of the present disclosure will be described with reference to the drawings. In the following embodiments, the substantially same structural portions will be indicated by the same reference signs and will not be redundantly described.

First Embodiment

As shown in FIG. 1, an actuator 10 of a first embodiment is applied to an internal combustion engine 11 that is a drive source for driving a vehicle.

(Intake and Exhaust System of Engine)

Figure 2:
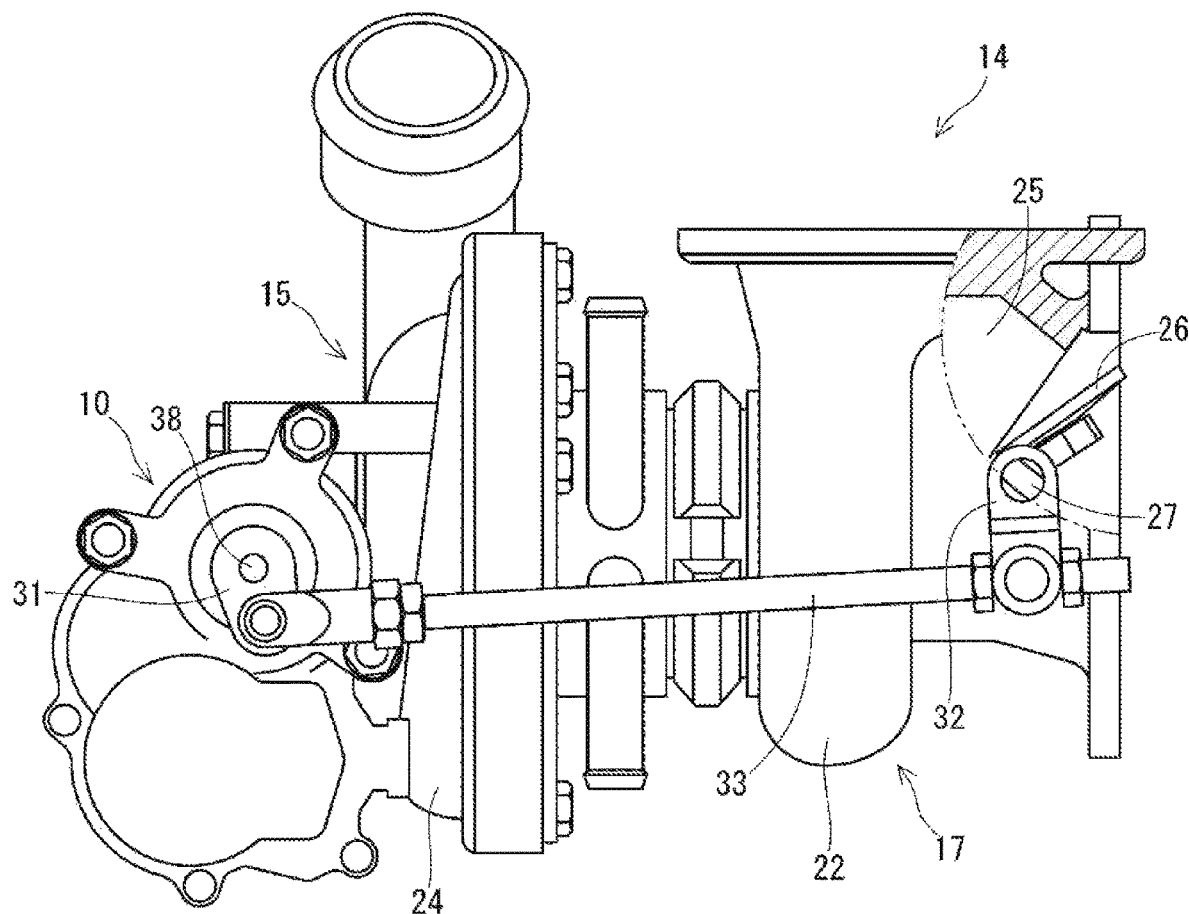
FIG. 2 is a descriptive view of a supercharger.

First of all, an intake and exhaust system of the engine 11 will be described with reference to FIGS. 1 and 2. The engine 11 has an intake passage 12, which conducts the air to cylinders of the engine 11, and an exhaust passage 13, which discharges an exhaust gas generated at the cylinders to the atmosphere. An intake compressor 15 of a supercharger 14 and a throttle valve 16 are provided in the intake passage 12 while the throttle valve 16 is configured to adjust the amount of intake air supplied to the engine 11. An exhaust turbine 17 of the supercharger 14 and a catalyst 18 are provided in the exhaust passage 13 while the catalyst 18 is configured to purify the exhaust gas. The catalyst 18 is a known three-way catalyst, which has a monolithic structure. When the temperature of the catalyst 18 is raised to an activation temperature, the catalyst 18 purifies harmful substances contained in the exhaust gas through oxidation and reduction.

The exhaust turbine 17 includes a turbine wheel 21, which is rotated by the exhaust gas outputted from the engine 11, and a turbine housing 22, which is shaped in a spiral form and receives the turbine wheel 21. The intake compressor 15 includes a compressor wheel 23, which is rotated by the rotational force of the turbine wheel 21, and a compressor housing 24, which is shaped in a spiral form and receives the compressor wheel 23.

A bypass passage 25, which conducts the exhaust gas while bypassing the turbine wheel 21, is formed at the turbine housing 22. The bypass passage 25 directly conducts the exhaust gas, which enters the turbine housing 22, to an exhaust gas outlet of the turbine housing 22. The bypass passage 25 can be opened and closed by a wastegate valve 26. The wastegate valve 26 is a swing valve that is rotatably supported by a valve shaft 27 at the inside of the turbine housing 22.

The supercharger 14 includes the actuator 10 as a drive means for driving the wastegate valve 26. The actuator 10 is installed to the intake compressor 15, which is distant from the exhaust turbine 17, in order to avoid the influences of the heat of the exhaust gas. The supercharger 14 includes a linkage mechanism 29 that is configured to transmit the output of the actuator 10 to the wastegate valve 26. The linkage mechanism 29 is a so-called four-bar linkage and includes: an output lever 31, which is rotated by the actuator 10; a valve lever 32, which is joined to the valve shaft 27; and a rod 33, which transmits a rotational torque from the output lever 31 to the valve lever 32.

The actuator 10 is controlled by an ECU (Engine Control Unit) 34 that includes a microcomputer. Specifically, the ECU 34 controls the boost pressure of the supercharger 14 by adjusting an opening degree of the wastegate valve 26 at the time of, for example, rotating the engine 11 at a high rotational speed. Furthermore, when the temperature of the catalyst 18 does not reach the activation temperature at, for example, the time immediately after cold start of the engine 11, the ECU 34 controls the actuator 10 to fully open the wastegate valve 26 to warm up the catalyst 18 with the exhaust gas. In this way, the high temperature exhaust gas, which has not lost its heat to the turbine wheel 21, can be conducted to the catalyst 18, so that the catalyst 18 can be warmed up within a short period of time.

(Actuator)

Next, the actuator 10 will be described with reference to FIGS. 3 to 7. The actuator 10 includes: a housing 35, which is installed to the intake compressor 15; an electric motor 36, which is installed to the housing 35; a speed reducer 37; an output shaft 38; and a rotational angle sensor 39.

Figure 3:
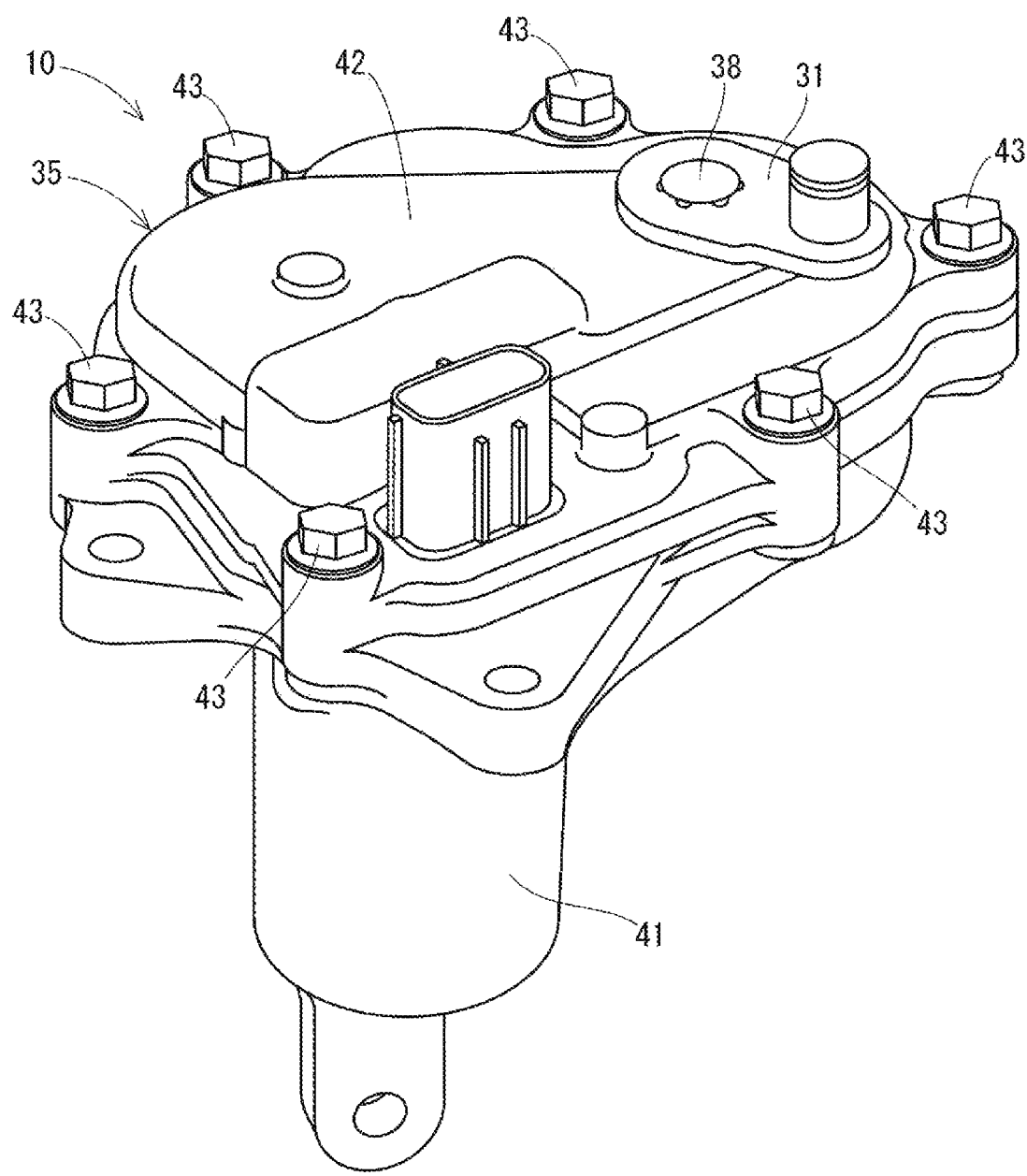
FIG. 3 is a perspective view of the actuator.
Figure 4:
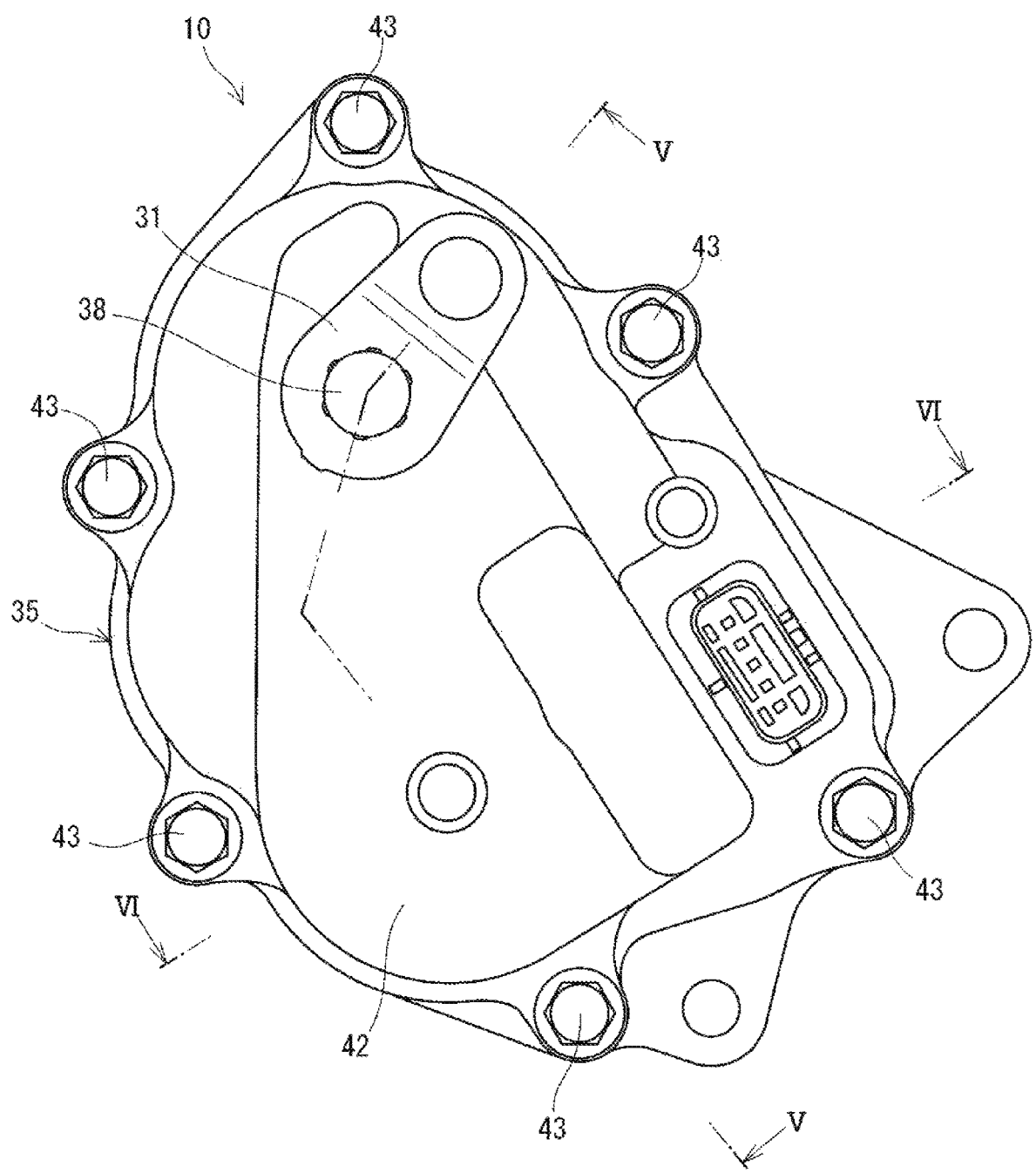
FIG. 4 is a top view of the actuator.
Figure 5:
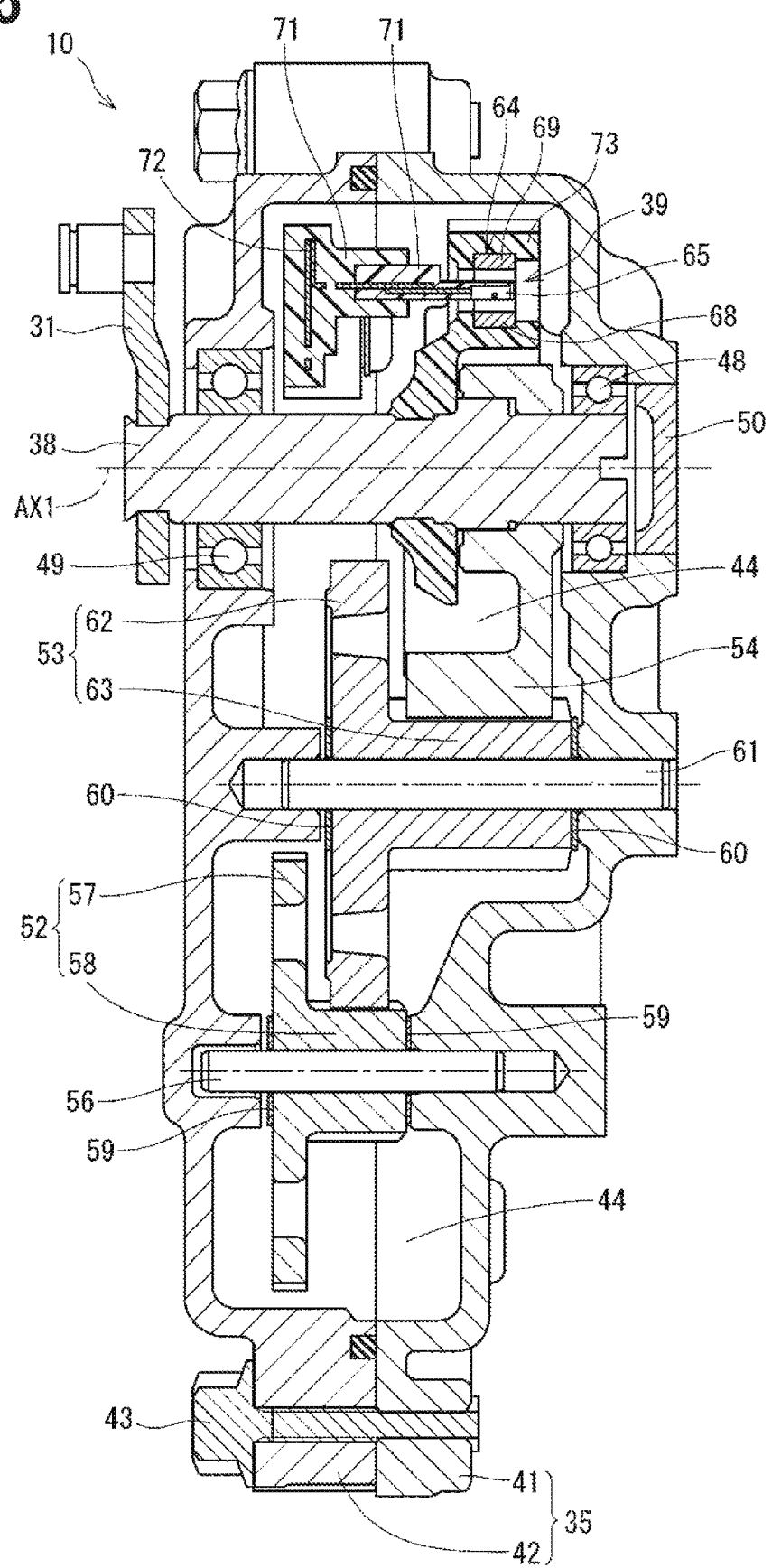
FIG. 5 is a cross-sectional view taken along line V-V in FIG. 4.

As shown in FIGS. 3 to 5, the housing 35 includes a first housing segment 41 and a second housing segment 42. The second housing segment 42 is joined to the first housing segment 41 by fastening members 43. The first housing segment 41 and the second housing segment 42 cooperate together to form a receiving space 44 therein. The first housing segment 41 and the second housing segment 42 are made of a metal material, such as an aluminum alloy, and are formed by die casting.

Figure 6:
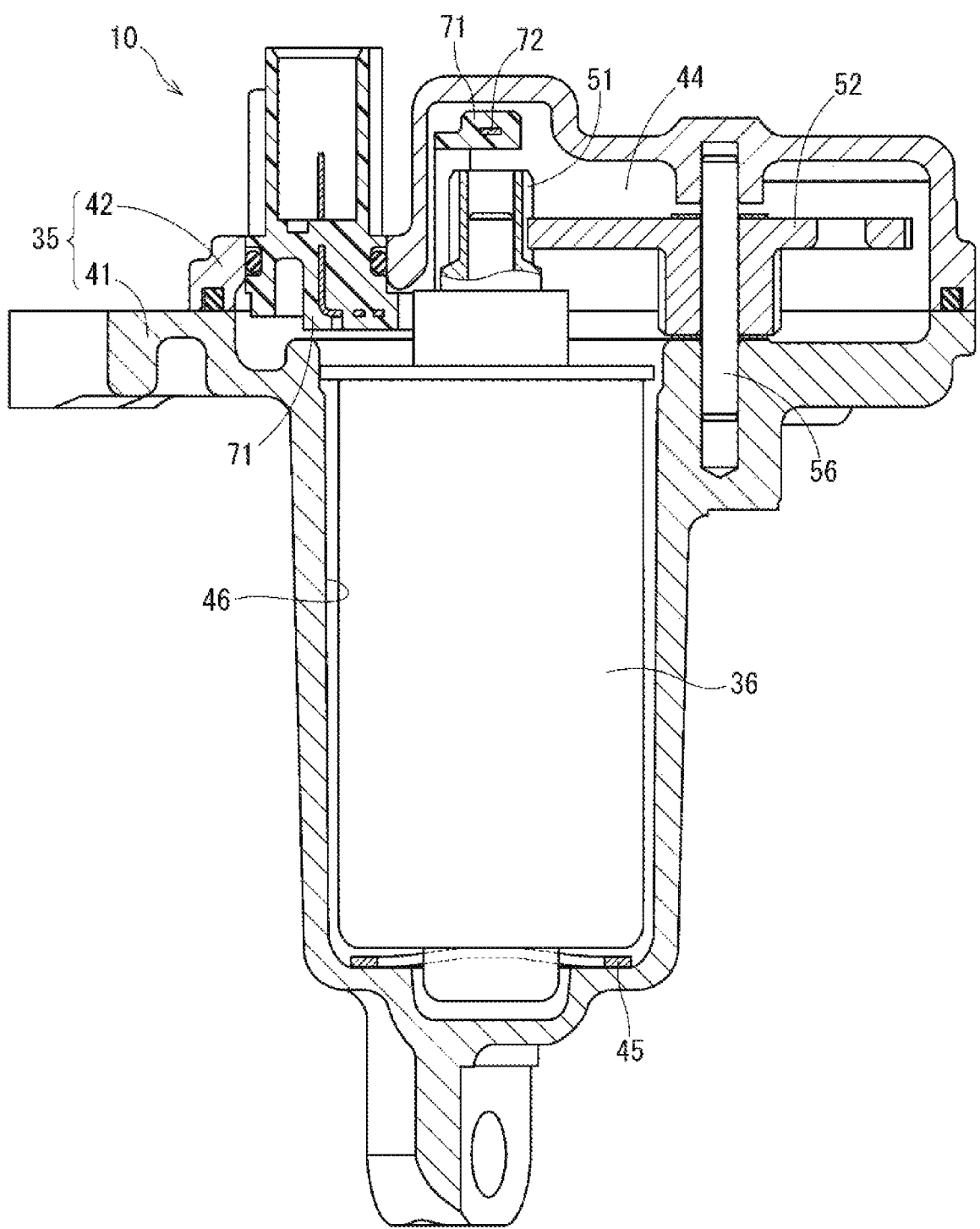
FIG. 6 is a cross-sectional view taken along line VI-VI in FIG. 4.
Figure 7:
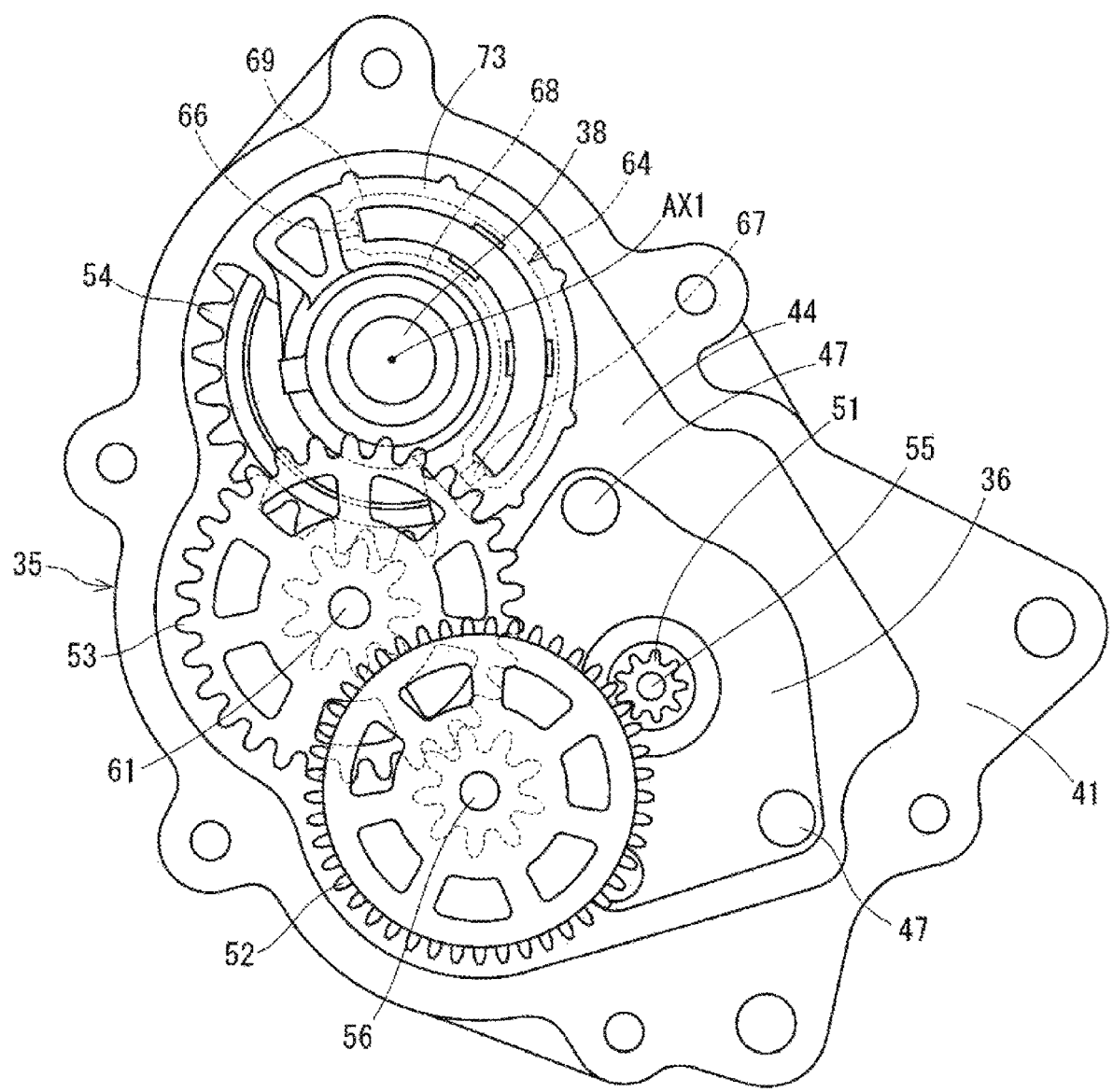
FIG. 7 is a view showing a state where a second housing segment of the actuator shown in FIG. 4 is removed.

As shown in FIGS. 6 and 7, the electric motor 36 is received in the housing 35. Specifically, the electric motor 36 is inserted into a motor insertion hole 46 formed at the first housing segment 41 and is fixed to the first housing segment 41 by screws 47. A wave washer 45 is installed between the electric motor 36 and a bottom surface of the motor insertion hole 46. The electric motor 36 may be any type of electric motor, such as a known DC motor, a known stepping motor or the like.

As shown in FIG. 5, the output shaft 38 is rotatably supported by a bearing 48, which is installed to the first housing segment 41, and a bearing 49, which is installed to the second housing segment 42. One end portion of the output shaft 38 projects to the outside of the housing 35. The output lever 31 is fixed to the one end portion of the output shaft 38 located at the outside of the housing 35. A plug 50 is press fitted to a portion of the first housing segment 41, which is located along an imaginary extension of the output shaft 38 at the other end of the output shaft 38.

As shown in FIGS. 5 to 7, the speed reducer 37 is a parallel shaft type speed reducer that reduces the speed of the rotation outputted from the electric motor 36 and transmits the rotation of the reduced speed to the output shaft 38. The speed reducer 37 includes a pinion gear 51, a first intermediate gear 52, a second intermediate gear 53 and a final gear 54. The pinion gear 51 is fixed to the motor shaft 55 of the electric motor 36. The first intermediate gear 52 is rotatably supported by a first metal shaft 56 and includes a first large diameter external gear 57, which is meshed with the pinion gear 51, and a first small diameter external gear 58, which has a diameter smaller than a diameter of the first large diameter external gear 57. A primary washer 59 is interposed between the first intermediate gear 52 and the first housing segment 41, and another primary washer 59 is interposed between the first intermediate gear 52 and the second housing segment 42. The second intermediate gear 53 is rotatably supported by a second metal shaft 61 and includes a second large diameter external gear 62, which is meshed with the first small diameter external gear 58, and a second small diameter external gear 63, which has a diameter smaller than a diameter of the second large diameter external gear 62. A secondary washer 60 is interposed between the second intermediate gear 53 and the first housing segment 41, and another secondary washer 60 is interposed between the second intermediate gear 53 and the second housing segment 42. The final gear 54 is fixed to the output shaft 38 and is meshed with the second small diameter external gear 63.

As shown in FIGS. 5 and 7, the rotational angle sensor 39 is a contactless sensor that senses a rotational angle of the output shaft 38, and the rotational angle sensor 39 includes a magnetic circuit device 64 and a sensing device 65. The magnetic circuit device 64 includes magnets (serving as magnetic flux generators) 66, 67 and yokes (serving as magnetic flux conductors) 68, 69. The magnets 66, 67 and the yokes 68, 69 form a closed magnetic circuit that is shaped in an arcuate form in a view taken in an axial direction of the output shaft 38. The magnetic circuit device 64 is held by a magnetic circuit holding member 73 made of a non-magnetic material and is rotated integrally with the output shaft 38. The sensing device 65 is, for example, a Hall IC and is placed at an inside of the closed magnetic circuit of the magnetic circuit device 64. The sensing device 65 is molded to a wiring holding member 71 made of a dielectric material and is fixed to the housing 35. The basic applications and functions of the magnetic circuit device 64 and the magnetic flux sensing device 65 are the same as those disclosed in JP2014-126548A (corresponding to US2014/0184204A, the disclosure of which is incorporated herein by reference in its entirety). The rotational angle of the output shaft 38, which is sensed with the rotational angle sensor 39, is outputted to the ECU 34 (see FIG. 1).

(Output Shaft and Output Lever)

Next, the output shaft 38 and the output lever 31 will be described with reference to FIGS. 8 to 12. The one end portion of the output shaft 38 is located at the outside of the housing 35 and has a large diameter portion 77, a cylindrical portion 78 and an enlarged diameter portion 79, which are axially arranged in this order from a side where the housing 35 is placed. A diameter of the large diameter portion 77 is larger than a diameter of the cylindrical portion 78. A step surface 81 is formed between the large diameter portion 77 and the cylindrical portion 78.

Figure 8:
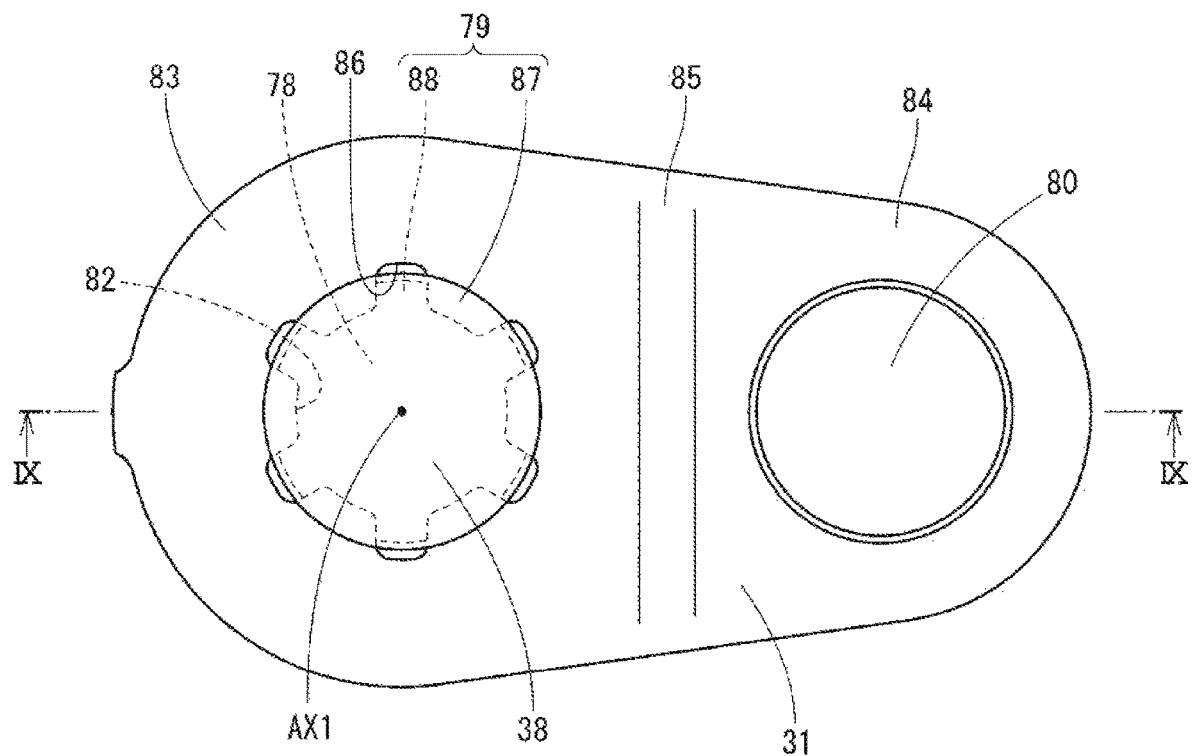
FIG. 8 is a diagram showing an output shaft and an output lever.
Figure 9:
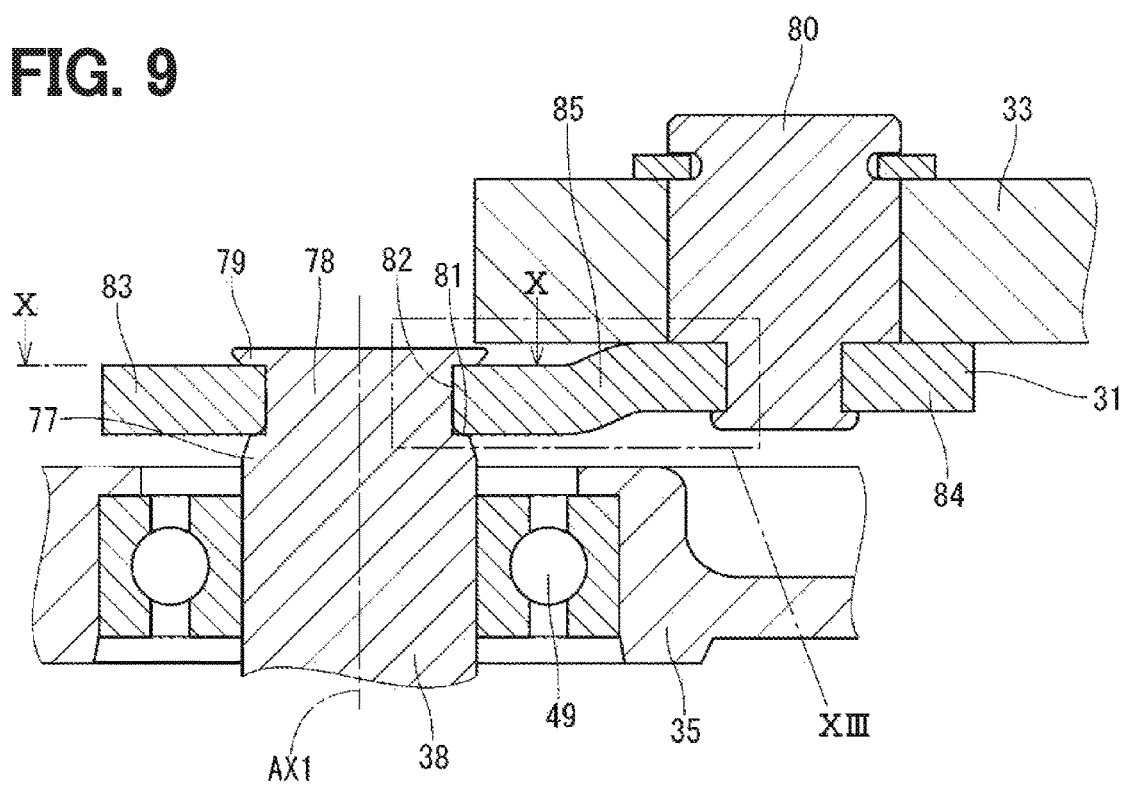
FIG. 9 is a cross-sectional view taken along line IX-IX in FIG. 8.
Figure 10:
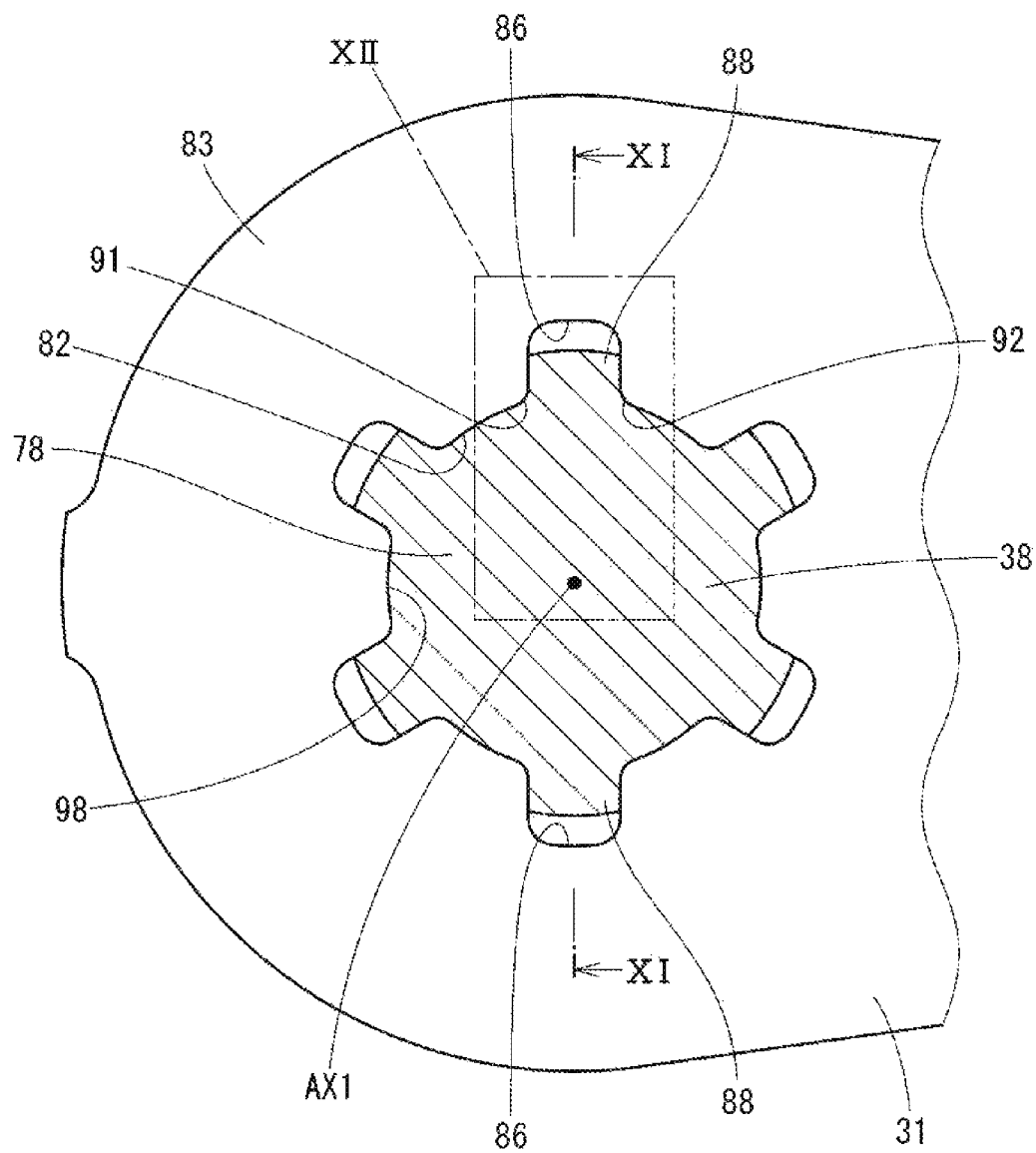
FIG. 10 is a cross-sectional view taken along line X-X in FIG. 9.

As shown in FIGS. 8 to 10, the output lever 31 includes: a shaft fixing portion 83 that has a cylindrical hole 82; a link connecting portion 84 that has a coupling part 80 and is connected with a rod (serving as a link) 33; and a step portion 85 that is located between the shaft fixing portion 83 and the link connecting portion 84. The step portion 85 offsets the link connecting portion 84 relative to the shaft fixing portion 83 toward one side in the axial direction of the cylindrical hole 82. Here, the one side in the axial direction of the cylindrical hole 82 is a side that is spaced away from the housing 35.

A central axis of the cylindrical hole 82 coincides with a central axis AX1 of the output shaft 38. In the following discussion, the axial direction of the cylindrical hole 82 will be simply referred to as the axial direction. Furthermore, a circumferential direction about the central axis AX1 will be simply referred to as the circumferential direction.

The shaft fixing portion 83 has the cylindrical hole 82, through which the cylindrical portion 78 is received; and a plurality of cutouts (recesses) 86, each of which is radially outwardly recessed from the cylindrical hole 82. In the first embodiment, the number of the cutouts 86 is six, and these six cutouts 86 are arranged at equal intervals in the circumferential direction. The shaft fixing portion 83 contacts the step surface 81.

Figure 11:
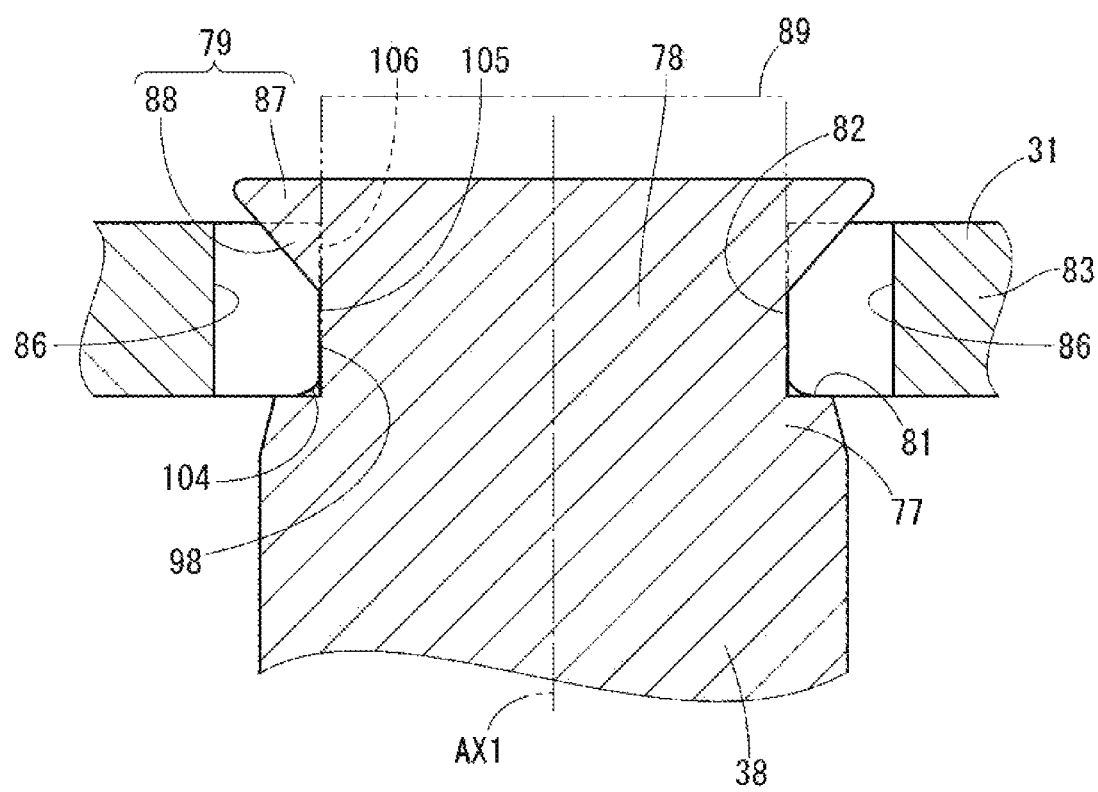
FIG. 11 is a cross-sectional view taken along line XI-XI in FIG. 10.

As shown in FIGS. 10 and 11, the enlarged diameter portion 79 includes: a flange 87, which has a diameter larger than a diameter of the cylindrical portion 78; and a plurality of biting parts 88, each of which extends into a corresponding one of the cutouts 86. The enlarged diameter portion 79 is formed by swaging at the time of assembling the output lever 31 to the output shaft 38. Now, this assembling procedure will be described. First of all, as indicated by a dot-dot-dash line in FIG. 11, the one end portion 89 of the output shaft 38 is inserted into the cylindrical hole 82 of the output lever 31. At this stage, an outer diameter of the one end portion 89 is slightly smaller than an inner diameter of the cylindrical hole 82. Next, a rotational position of the output lever 31 relative to the output shaft 38 is set. As discussed above, the rotational position of the output lever 31 can be changed and finely adjusted before the time of fixing the output lever 31, so that the versatility and the position accuracy can be improved. Next, the one end portion 89 is deformed as indicated by a solid line in FIG. 11 by a swaging process. At this time, a diameter of a section of the one end portion 89, which is placed in the cylindrical hole 82, is enlarged and becomes the cylindrical portion 78. The cylindrical portion 78 is in close contact with the inner wall surface 98. In addition, another section of the one end portion 89, which projects outward from the cylindrical hole 82, is swaged and becomes the flange 87. Also, a segment of the one end portion 89, which is placed adjacent to the opening of the cylindrical hole 82, is plastically deformed toward the radially outer side and plastically flows into the cutouts 86 to form the biting parts 88.

Figure 12:
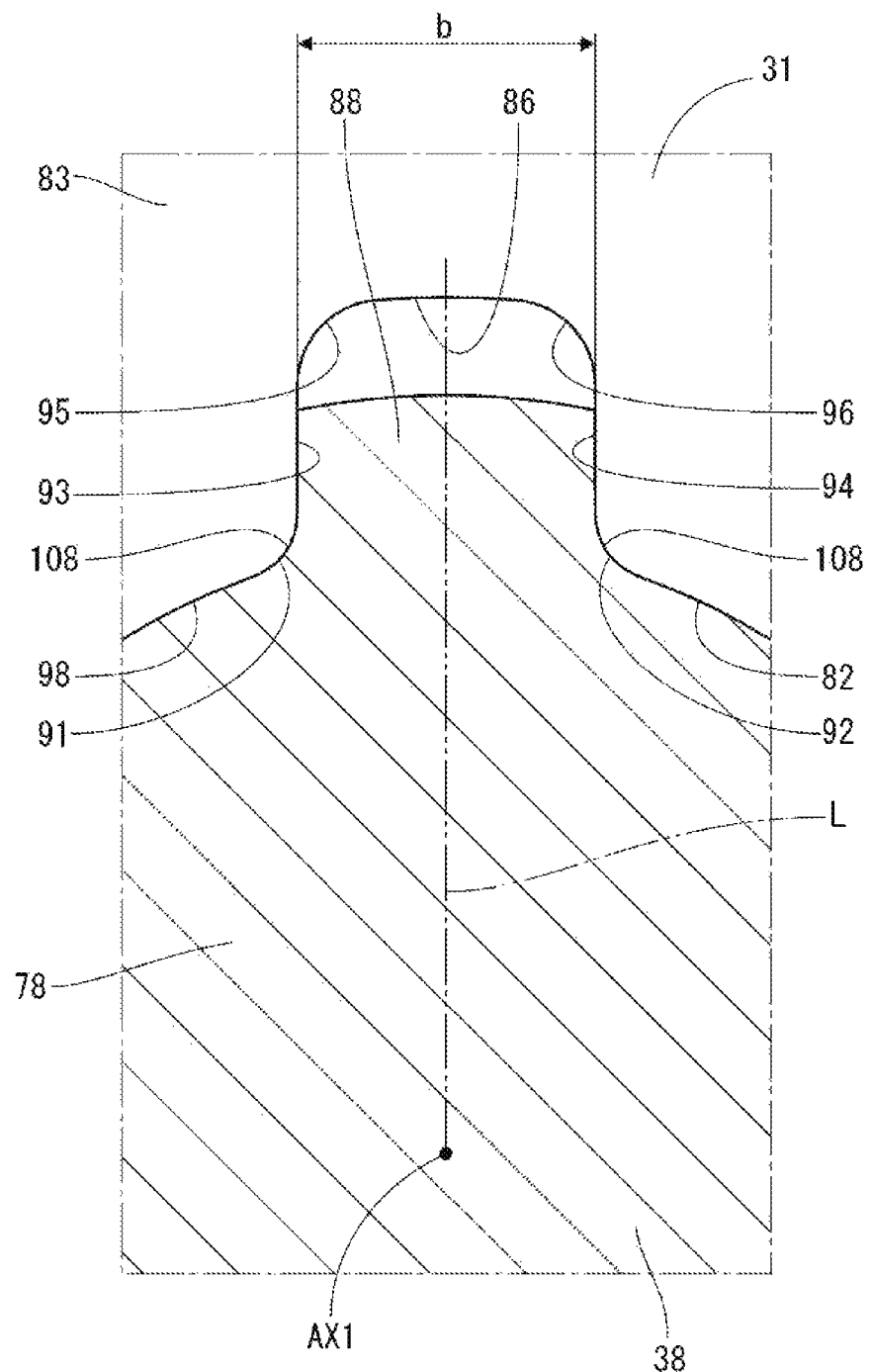
FIG. 12 is a partial enlarged view of an area XII in FIG. 10.

As shown in FIG. 12, the inner wall surface of each of the cutouts 86 includes a first root corner 91, a second root corner 92, a first planar surface part 93, a second planar surface part 94, a first concave corner 95 and a second concave corner 96.

Each of the first and second root corners 91, 92 is a convex corner at a root of the inner wall surface of the cutout 86 and is joined to the inner wall surface 98 of the cylindrical hole 82. Each of the root corners 91, 92 is shaped in a convex curved surface form in the view taken in the axial direction. In the first embodiment, a cross section of each of the first and second root corners 91, 92, which is perpendicular to the axial direction, is shaped in an arcuate form that has a constant radius of curvature along an entire extent of the root corner 91, 92. The radius of curvature of the root corner 91, 92 is equal to or larger than 0.2 and may be, for example, 0.5. Each of the first and second root corners 91, 92 is shaped in a round form that smoothly joins to the inner wall surface 98 of the cylindrical hole 82.

The first planar surface part 93 joins to the first root corner 91. The first root corner 91 is shaped in the round from that smoothly joins to the first planar surface part 93. The second planar surface part 94 joins to the second root corner 92. The second root corner 92 is shaped in the round from that smoothly joins to the second planar surface part 94. Each of the first and second planar surface parts 93, 94 is shaped in a planar surface form in the view taken in the axial direction. The biting part 88 outwardly extends to the first and second planar surface parts 93, 94. The first and second planar surface parts 93, 94 are engaged with the biting part 88 in the circumferential direction.

In the view taken in the axial direction, a straight line, which is located at an intermediate location between the first planar surface part 93 and the second planar surface part 94 and extends through the central axis AX1, is defined as an imaginary straight line L. The first planar surface part 93 and the second planar surface part 94 are parallel with the imaginary straight line L. Thereby, the first planar surface part 93 and the second planar surface part 94 are substantially perpendicular to a tangential direction that is tangential to a rotational direction of the output shaft 38.

The first concave corner 95 and the second concave corner 96 are located at the radially outer side corners of the inner wall surface of the cutout 86 and are respectively shaped in a concave curved surface form in the view taken in the axial direction. In the first embodiment, a cross section of each of the first and second concave corners 95, 96, which is perpendicular to the axial direction, is an arcuate form having a constant radius of curvature along an entire extent of the concave corner 95, 96 and is shaped in a round form that smoothly joins to the first planar surface part 93 or the second planar surface part 94.

Figure 13:
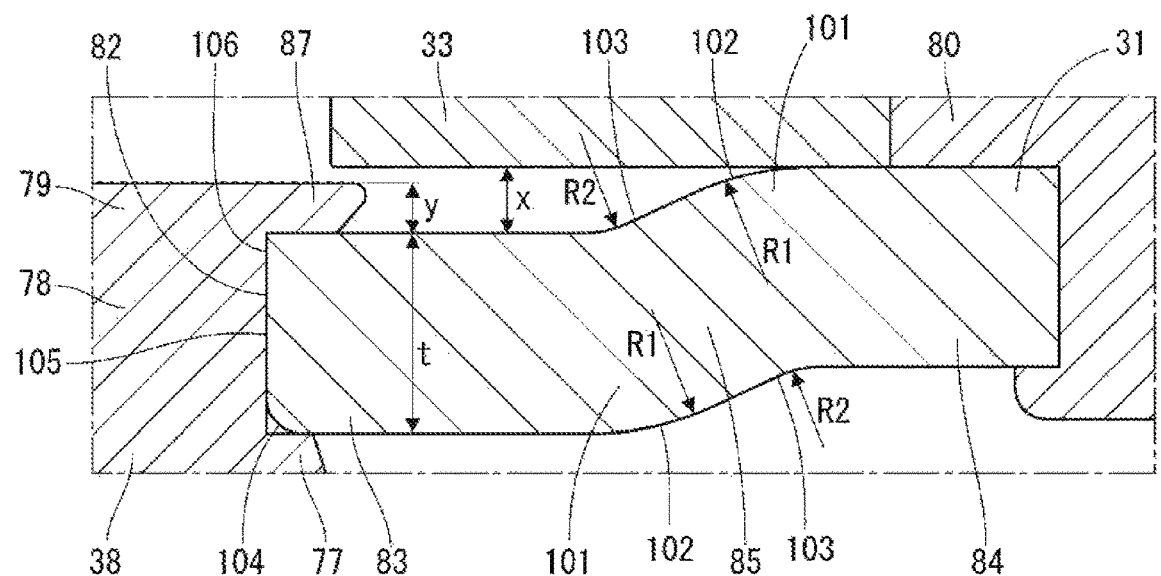
FIG. 13 is a partial enlarged view of an area XIII in FIG. 9.

As shown in FIGS. 8 to 11, the output lever 31 is a stamped element made of stainless steel and is formed by a press stamping process. The step portion 85 is formed by a bending process performed at the time of stamping the output lever 31 from a plate material. As shown in FIG. 13, the step portion 85 has two bending parts 101. A radius of curvature of an outer convex curved surface 102 of each bending part 101 is denoted by R1, and a radius of curvature of an inner concave curved surface 103 of the bending part 101 is denoted by R2. Furthermore, a thickness of the step portion 85, i.e., a thickness (plate thickness) of the output lever 31 is denoted by t. The above respective values satisfy the relationship of the following equation (1).

$$R1=R2+t \quad (1)$$

As shown in FIG. 11, the cylindrical hole 82 and the cutouts 86, which are formed by the press stamping process, respectively have a shear droop 104, a sheared surface 105 and a fractured surface 106, which are arranged in this order in a stamping direction. In the output lever 31, the shear droop 104 is located on a side where the step surface 81 is placed in the axial direction, and the fractured surface 106 is located on another side where the enlarged diameter portion 79 is placed in the axial direction. Each of the biting parts 88 is engaged with the fractured surface 106 of the corresponding cutout 86. A length of the sheared surface 105 of the cylindrical hole 82 measured in the axial direction is equal to or larger than two thirds of the thickness t of the output lever 31.

As shown in FIG. 13, an offset amount of the link connecting portion 84 relative to the shaft fixing portion 83 is denoted by x, and a projecting amount (i.e., the height of the flange 87) of the output shaft 38 from the shaft fixing portion 83 is denoted by y. The above respective values satisfy the relationship of the following equation (2).

$$x \geq y \quad (2)$$

As shown in FIG. 12, a circumferential width of each of the cutouts 86 measured in the circumferential direction is denoted by b. The width b and the thickness t satisfy the relationship of the following equation (3).

$$b < t \quad (3)$$

(Advantages)

As described above, the one end portion of the output shaft 38 has the large diameter portion 77, the cylindrical portion 78 and the enlarged diameter portion 79, which are axially arranged in this order from the side where the housing 35 is placed. The output lever 31 has: the cylindrical hole 82, through which the cylindrical portion 78 is received; and the cutouts 86, each of which is radially outwardly recessed from the cylindrical hole 82. The output lever 31 contacts the step surface 81, which is formed between the large diameter portion 77 and the cylindrical portion 78. The enlarged diameter portion 79 includes: the flange 87, which has the diameter larger than the diameter of the cylindrical portion 78; and the plurality of biting parts 88, each of which extends into the corresponding one of the cutouts 86. Each of the first and second root corners 91, 92 of the inner wall surface of the cutout 86 is shaped in the convex curved surface form in the view taken in the axial direction of the cylindrical hole 82.

Therefore, two roots 108 of the biting part 88, which respectively correspond to the corresponding root corner 91, 92, are respectively shaped in a concave curved surface form that conforms with the shape of the corresponding root corner 91, 92. Thereby, the stress concentration to the roots 108 of the biting part 88 at the time of applying the torque is limited. Thus, the shear strength of the biting part 88 is improved, and the damage of the output shaft 38 caused by the shear force exerted at the time of applying the torque can be limited.

Furthermore, the output shaft 38 and the output lever 31 are assembled together by inserting the cylindrical portion 78 into the cylindrical hole 82, so that it is possible to limit variations in the pitch measured from the axis AX1. Furthermore, by contacting the output lever 31 to the step surface 81 of the output shaft 38, it is possible to limit variations in the axial position of the output lever 31 relative to the output shaft 38. Furthermore, the torque is transmitted by using the engaging force between each biting part 88 and the inner wall surface of the corresponding cutout 86 in addition to the frictional force between the cylindrical portion 78 and the inner wall surface 98 of the cylindrical hole 82, so that the sufficient strength of the swaged engagement can be ensured against the large torque.

Furthermore, in the first embodiment, the inner wall surface of each cutout 86 has the first and second planar surface parts 93, 94. The first and second planar surface parts 93, 94 are respectively joined to the first and second root corners 91, 92 and are respectively shaped in the planar surface form in the view taken in the axial direction of the cylindrical hole 82. The biting part 88 outwardly extends to the first and second planar surface parts 93, 94. Therefore, at the time of executing the swaging process, the one end portion 89 of the output shaft 38 can be easily deformed to plastically flow along the first and second planar surface parts 93, 94. Therefore, each biting part 88 can make a surface-to-surface contact with the first and second planar surface parts 93, 94.

Furthermore, in the first embodiment, in the view taken in the axial direction of the cylindrical hole 82, the first planar surface part 93 and the second planar surface part 94 are parallel with the imaginary straight line L, which is located at the intermediate location between the first planar surface part 93 and the second planar surface part 94 and extends through the central axis AX1 of the cylindrical hole 82. Thereby, the first planar surface part 93 and the second planar surface part 94 are both substantially perpendicular to the tangential direction. Therefore, the torque of the output shaft 38 can be received by the surface that is perpendicular to the application direction of the torque. Further, the difference caused by the rotational direction can be eliminated. Furthermore, at the time of executing the swaging process, even when the amount of plastic flow of the metal of the biting part 88 along the first and second planar surface parts 93, 94 varies, the width of the biting part 88 in the circumferential direction is kept constant. Therefore, variations in the strength of the biting part 88 can be limited.

Furthermore, in the first embodiment, each of the first and second concave corners 95, 96 of the inner wall surface of the cutout 86 is shaped in the concave curved surface form in the view taken in the axial direction of the cylindrical hole 82. Therefore, when a force is applied to the output lever 31 to cause widening of the cutout 86 in the circumferential direction at the time of applying the torque, a stress concentration on the first and second concave corners 95, 96 is limited. Thus, a large torque can be applied to the output lever 31.

Furthermore, in the first embodiment, the output lever 31 includes: the shaft fixing portion 83 that has the cylindrical hole 82; the link connecting portion 84 that is connected with the rod 33; and the step portion 85 that offsets the link connecting portion 84 relative to the shaft fixing portion 83 toward the one side in the axial direction. The step portion 85 has the two bending parts 101. The radius R1 of curvature of the outer convex curved surface 102 of the bending part 101 is equal to the sum of the radius R2 of curvature of the inner concave curved surface 103 and the thickness t of the step portion 85. By shaping the bending part 101 in the round form in the above described manner, the stress concentration at the bending part 101 can be avoided, and the load capacity of the output lever 31 can be increased.

Furthermore, in the first embodiment, the offset amount x of the link connecting portion 84 relative to the shaft fixing portion 83 is equal to or larger than the projecting amount y of the output shaft 38 from the shaft fixing portion 83. Therefore, it is possible to avoid the interference between the output shaft 38 and the rod 33 connected to the link connecting portion 84.

Furthermore, in the first embodiment, the output lever 31 is made of the stainless steel. Therefore, it is possible to impart the corrosion resistance to the output lever 31, which is placed at the outside of the housing 35 in the engine room. Furthermore, unlike a case where the corrosion resistance is imparted to the output lever 31 by a surface treatment, the corrosion resistance of the output lever 31 of the present embodiment can be maintained even when the output lever 31 is worn through sliding between the output lever 31 and the rod 33.

Furthermore, in the first embodiment, the output lever 31 is the stamped element that is formed such that the shear droop 104 of the cylindrical hole 82 is located on the side where the step surface 81 is placed, and the fractured surface 106 of the cylindrical hole 82 is located on the other side where the enlarged diameter portion 79 is placed. With this configuration, the shear droop 104 is not placed on the other side where the enlarged diameter portion 79 is placed, and the biting part 88 is engaged with the fractured surface 106. Therefore, the biting surface area of the biting part 88 can be increased as much as possible, that is, the amount of engagement of the biting part 88 relative to the output lever 31 can be increased as much as possible. Furthermore, a corner of the fractured surface 106 has a sharper angle (so-called right or acute angle) in comparison to an angle of the shear droop 104, so that it is possible to reduce the variations in the biting surface area.

Furthermore, in the first embodiment, the length of the sheared surface 105 of the cylindrical hole 82 is equal to or larger than two thirds of the thickness t of the output lever 31. A surface roughness of the sheared surface 105 is smaller than a surface roughness of the fractured surface 106. Therefore, a frictional force between the inner wall surface 98 of the cylindrical hole 82 and the cylindrical portion 78 is stabilized. Furthermore, the positional accuracy between the output shaft 38 and the output lever 31 is improved.

Furthermore, according to the first embodiment, the width b of the cutout 86 measured in the circumferential direction is smaller than the thickness t of the output lever 31. By making the width b relatively small in this way, the one end portion 89 can plastically flow in both of the radial direction and the axial direction as much as possible at the time of swaging, and thereby the amount of engagement of the biting part 88 relative to the output lever 31 can be increased as much as possible. Furthermore, by making the thickness t relatively large, the shear strength of the biting part 88 can be improved.

Figure 14:
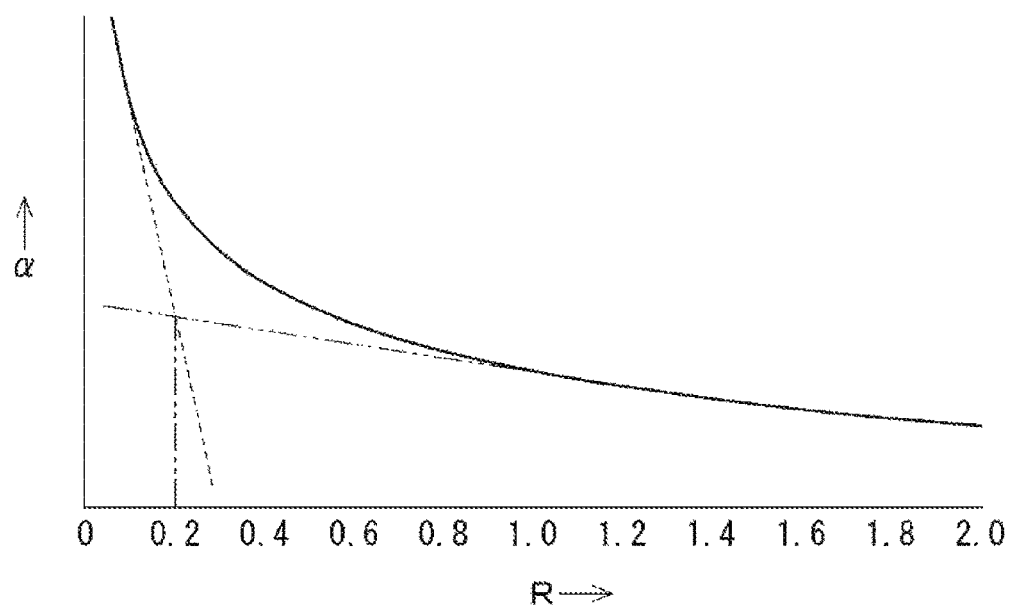
FIG. 14 is a diagram indicating a relationship between a radius of curvature of a root corner of a cutout of an output lever and a stress concentration factor (a shape factor).

FIG. 14 is a diagram indicating a relationship between the radius R of curvature of the root corner 91, 92 and a stress concentration factor (a shape factor) a. The stress concentration factor (shape factor) a is expressed by the following equation (4) where ax indicates a stress generated at the root 108 of the biting part 88 (serving as a stress concentration part), and a indicates a stress generated in a case where the stress concentration does not exist at the time of applying an identical load that is identical to a load applied to the root 108 at the time of generating the stress ax.

$$\sigma x = \alpha \times \sigma \quad (4)$$

As indicated in FIG. 14, when the radius R of curvature is equal to or larger than 0.2, the stress concentration factor (shape factor) a becomes relatively small, and the stress ax at the root 108 of the biting part 88 becomes relatively small. In the first embodiment, the radius of curvature of the root corner 91, 92 is equal to or larger than 0.2. Therefore, the stress ax at the root 108 of the biting part 88 becomes small, and thereby the stress concentration at the root 108 is limited.

Second Embodiment

Figure 15:
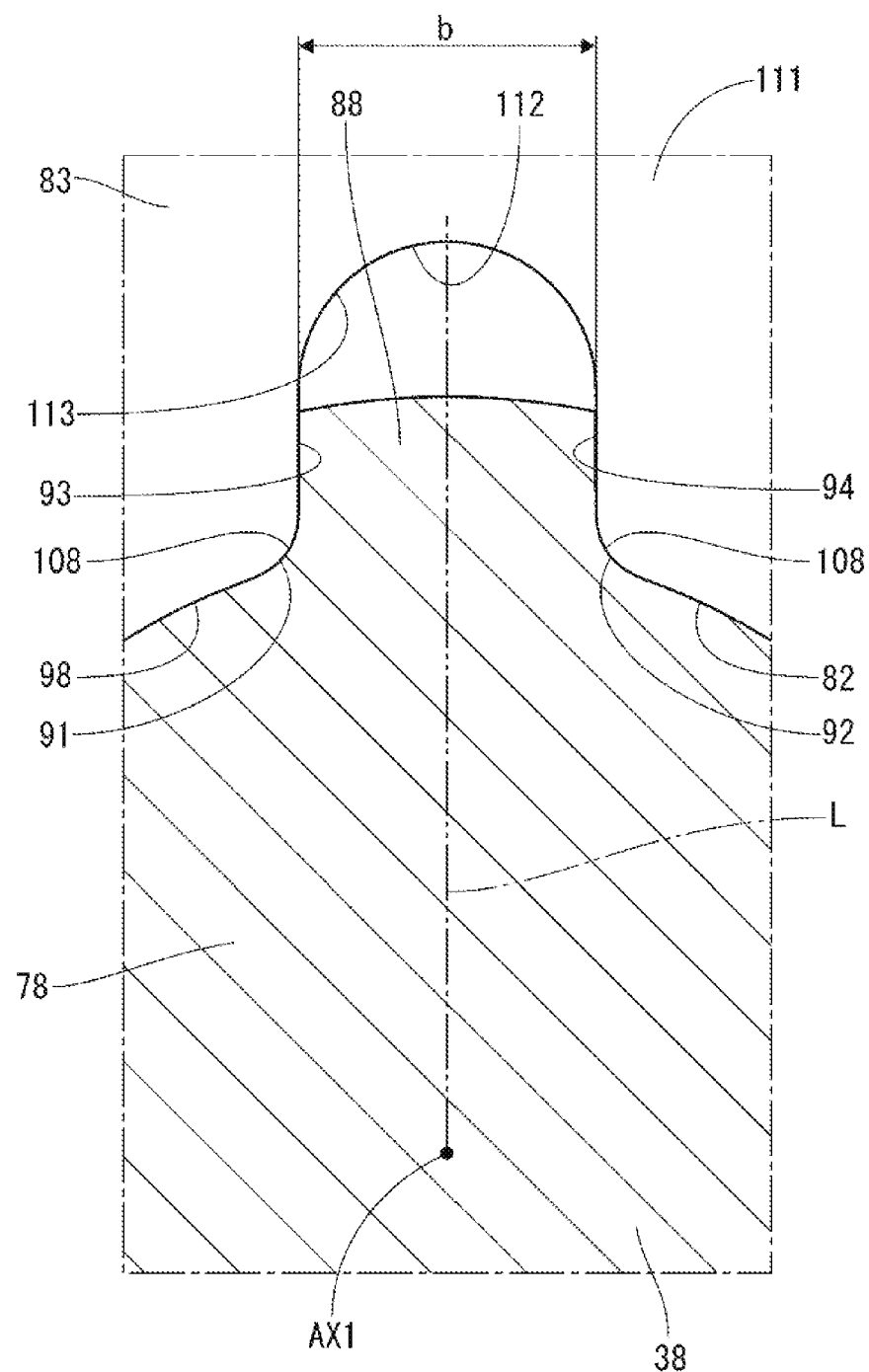
FIG. 15 is a diagram indicating a cutout of an output lever of an actuator according to a second embodiment.

In the second embodiment, as shown in FIG. 15, a concave corner 113 of a cutout 112 of an output lever 111 is a single concave curved surface that joins between one side of an inner wall surface of the cutout 112, at which the first root corner 91 is placed, and another side of the inner wall surface of the cutout 112, at which the second root corner 92 is placed. Specifically, the concave corner 113 is the single concave curved surface that joins between the first planar surface part 93 and the second planar surface part 94. With this configuration, the radius of curvature of the concave corner 113 can be made large as much as possible. Therefore, the stress concentration at the concave corner 113 at the time of applying the torque can be effectively limited.

Third Embodiment

Figure 16:
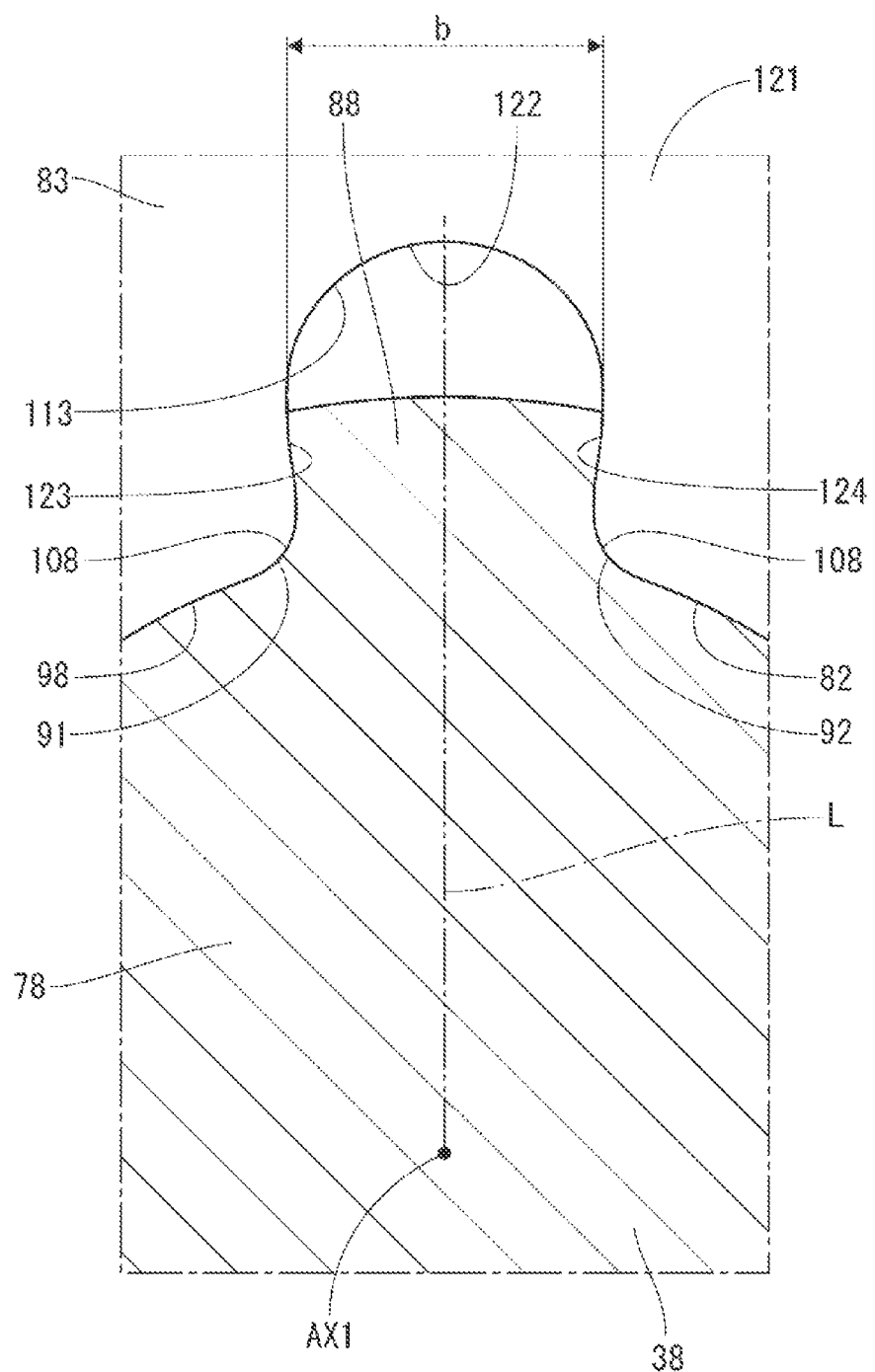
FIG. 16 is a diagram indicating a cutout of an output lever of an actuator according to a third embodiment.

In the third embodiment, as shown in FIG. 16, an inner wall surface of a cutout 122 of an output lever 121 includes the root corners 91, 92, the concave corner 113, a first curved surface 123 and a second curved surface 124. The first curved surface 123 joins between the first root corner 91 and the concave corner 113. The second curved surface 124 joins between the second root corner 91 and the concave corner 113. As discussed above, the inner wall surface of the cutout 122 does not need to have the planar surface part(s).

Other Embodiments

In another embodiment, the radius of curvature of each root corner and the radius of curvature of each concave corner at each cutout may not be constant. Specifically, one or more of the root corners and the concave corner(s) may be shaped such that the radius of curvature progressively changes along it, or a plurality of radius of curvatures are provided along it. In short, it is only necessary that the root corner is shaped in the convex curved surface form in the view taken in the axial direction. Furthermore, the number of the cutouts may be equal to or less than five or may be equal to or larger than seven.

In another embodiment, the output lever may not need to have the step portion. Furthermore, the coupling part of the link connecting portion of the output lever may be formed integrally in one piece with a main body of the output lever. Furthermore, the output lever may be made of another material that is other than stainless steel. Furthermore, the output lever may be formed by another process that is other than the press stamping process.

In another embodiment, the application of the actuator is not necessarily limited to the one for controlling the boost pressure, and the actuator of the present disclosure may be used in another application. In short, the actuator of the present disclosure only needs to have the configuration, in which the one end portion of the output shaft is exposed at the outside of the housing, and the output lever is fixed to this one end portion of the output shaft.

The present disclosure has been described with reference to the embodiments. However, the present disclosure should not be limited to the above embodiments and the structures described above. The present disclosure also encompasses various modifications and variations within the equivalent scope. In addition, various combinations and forms, and other combinations and forms including only one element, more or less, are also included in the scope and spirit of the present disclosure.

What is claimed is:

1. An actuator comprising:
an electric motor;
a speed reducer that is connected to the electric motor;
an output shaft that is connected to the speed reducer;
a housing that receives the electric motor and the speed reducer and supports the output shaft; and
an output lever that is fixed to one end portion of the output shaft, which is located at an outside of the housing, wherein:
the one end portion of the output shaft has a large diameter portion, a cylindrical portion and an enlarged diameter portion, which are axially arranged in this order from a side where the housing is placed;
the output lever includes a cylindrical hole, through which the cylindrical portion is received, and a cutout, which is radially outwardly recessed from the cylindrical hole, while the output lever contacts a step surface formed between the large diameter portion and the cylindrical portion;
the enlarged diameter portion includes a flange, which has a diameter larger than a diameter of the cylindrical portion, and a biting part, which extends into the cutout;
a part of an inner wall surface of the cutout, which is connected to an inner wall surface of the cylindrical hole, is defined as a root corner; and
the root corner is shaped in a convex curved surface form in a view taken in an axial direction of the cylindrical hole.

2. The actuator according to claim 1, wherein
the inner wall surface of the cutout includes a planar surface part, which joins to the root corner and is shaped in a planar surface form in the view taken in the axial direction of the cylindrical hole; and
the biting part extends to the planar surface part.

3. The actuator according to claim 2, wherein
the planar surface part is one of a first planar surface part, which joins to the root corner that serves as one root corner, and a second planar surface part, which joins to another root corner of the inner wall surface of the cutout; and
in the view taken in the axial direction of the cylindrical hole, the first planar surface part and the second planar surface part are parallel with a straight line, which is located at an intermediate location between the first planar surface part and the second planar surface part and extends through a central axis of the cylindrical hole.

4. The actuator according to claim 1, wherein a concave corner, which is located at a radially outer side of the inner wall surface of the cutout, is shaped in a concave curved surface form in the view taken in the axial direction of the cylindrical hole.

5. The actuator according to claim 4, wherein the concave corner is a single concave curved surface that joins between one side of the inner wall surface of the cutout, at which the one root corner is placed, and another side of the inner wall surface of the cutout, at which the another root corner is placed.

6. The actuator according to claim 1, wherein:
the output lever includes:
a shaft fixing portion that has the cylindrical hole;
a link connecting portion that is configured to be connected with a link of another member; and
a step portion that offsets the link connecting portion relative to the shaft fixing portion toward one side in the axial direction of the cylindrical hole;
the step portion includes two bending parts; and
a radius of curvature of an outer convex curved surface of each of the two bending parts is equal to a sum of a radius of curvature of an inner concave curved surface of the bending part and a thickness of the step portion.

7. The actuator according to claim 6, wherein an offset amount of the link connecting portion relative to the shaft fixing portion is equal to or larger than a projecting amount of the output shaft from the shaft fixing portion.

8. The actuator according to claim 1, wherein the output lever is made of stainless steel.

9. The actuator according to claim 1, wherein the output lever is a stamped element while a shear droop of the cylindrical hole is located on a side where the step surface is placed, and a fractured surface of the cylindrical hole is located on another side where the enlarged diameter portion is placed.

10. The actuator according to claim 9, wherein a length of a sheared surface of the cylindrical hole measured in the axial direction is equal to or larger than two thirds of a thickness of the output lever.

11. The actuator according to claim 1, wherein a circumferential width of the cutout is smaller than a thickness of the output lever.

12. The actuator according to claim 1, wherein a radius of curvature of the root corner is equal to or larger than 0.2.

\* \* \* \* \*